United States Patent
Hayata et al.

(10) Patent No.: US 9,904,271 B2
(45) Date of Patent: Feb. 27, 2018

(54) MANUFACTURING METHOD AND MANUFACTURING DEVICE FOR MANUFACTURING A JOINED PIECE

(71) Applicant: Nissan Motor Co., Ltd., Yokohama, Kanagawa (JP)

(72) Inventors: Junji Hayata, Atsugi (JP); Satoru Takizawa, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 752 days.

(21) Appl. No.: 14/357,907

(22) PCT Filed: Nov. 16, 2012

(86) PCT No.: PCT/JP2012/079838
§ 371 (c)(1),
(2) Date: May 13, 2014

(87) PCT Pub. No.: WO2013/073683
PCT Pub. Date: May 23, 2013

(65) Prior Publication Data
US 2014/0309762 A1    Oct. 16, 2014

(30) Foreign Application Priority Data

Nov. 16, 2011  (JP) ................................ 2011-250679
Nov. 16, 2012  (JP) ................................ 2012-252064

(51) Int. Cl.
G05B 19/402   (2006.01)
B25J 9/16     (2006.01)

(52) U.S. Cl.
CPC .......... G05B 19/402 (2013.01); B25J 9/1682 (2013.01); B25J 9/1697 (2013.01);
(Continued)

(58) Field of Classification Search
None
See application file for complete search history.

(56) References Cited

U.S. PATENT DOCUMENTS 4,613,943 A * 9/1986 Miyake .................... B23K 9/12
                                                     318/568.2
5,572,102 A * 11/1996 Goodfellow ........... B25J 9/1697
                                                     219/124.1
(Continued)

FOREIGN PATENT DOCUMENTS

DE   10 2006 003 555 A1   7/2007
JP         7-88730 A      4/1995
(Continued)

Primary Examiner — Charles E Anya
(74) Attorney, Agent, or Firm — Global IP Counselors, LLP

(57) ABSTRACT

A manufacturing method for joining first and second members to create a joined piece using a robot with pre-inputted instruction data. The method includes operating the robot to hold the second member for joining to the first member and photographing the second member to obtain an image of the second member at the holding position; comparing the image to a reference image of a joining position of a reference second member joined to a reference first member; determining a deviation amount by which the holding position of the second member deviates from the joining position in the reference image; determining a correction amount for correcting the holding position of the second member is to be corrected in order to reduce the deviation amount of the holding position of the second member; correcting the holding position of the second member according to the correction amount, and then subsequently joining the first and second members.

14 Claims, 5 Drawing Sheets

(52) U.S. Cl.
CPC .............. *G05B 2219/39131* (2013.01); *G05B 2219/39132* (2013.01); *G05B 2219/39393* (2013.01); *G05B 2219/39397* (2013.01); *G05B 2219/40611* (2013.01); *Y10S 901/42* (2013.01); *Y10S 901/47* (2013.01)

(56) References Cited

U.S. PATENT DOCUMENTS

| | | | | |
|---|---|---|---|---|
| 5,715,375 | A * | 2/1998 | Ito ........................ | B23K 9/1274 700/258 |
| 7,904,201 | B2 * | 3/2011 | Nagatsuka ............. | B25J 9/1682 700/245 |
| 2004/0201194 | A1 * | 10/2004 | Zhang ..................... | B62D 3/12 280/93.515 |
| 2005/0102060 | A1 * | 5/2005 | Watanabe ............... | B25J 9/1697 700/245 |
| 2005/0169346 | A1 * | 8/2005 | Murray, Jr. .......... | B23K 26/032 374/121 |
| 2007/0075048 | A1 * | 4/2007 | Kunisaki .............. | B23K 11/253 219/91.1 |
| 2007/0276539 | A1 * | 11/2007 | Habibi .................. | B25J 9/1612 700/245 |
| 2009/0280349 | A1 * | 11/2009 | Bittendorfer .......... | B23K 26/26 428/594 |

FOREIGN PATENT DOCUMENTS

| | | |
|---|---|---|
| JP | 8-48174 A | 2/1996 |
| JP | 11-90641 A | 4/1999 |
| JP | 2000-219171 A | 8/2000 |
| JP | 2011-11692 A | 1/2011 |
| WO | 2007/004983 A1 | 1/2007 |

\* cited by examiner

MANUFACTURING METHOD AND MANUFACTURING DEVICE FOR MANUFACTURING A JOINED PIECE

CROSS-REFERENCE TO RELATED APPLICATIONS

This application is a U.S. National stage application of International Application No. PCT/JP2012/079838, filed Nov. 16, 2012, which claims priority to Japanese Patent Application No. 2011-250679 filed in Japan on Nov. 16, 2011, and Japanese Patent Application No. 2011-252064 filed in Japan on Nov. 16, 2012, the contents of which are hereby incorporated herein by reference.

BACKGROUND

Field of the Invention

The present invention relates to a method and device for manufacturing a joined piece.

Background Information

Vehicle component parts are manufactured using various methods, such as casting, forging, and welding. For example, one type of vehicle component, a steering member (also known as a steering support member) features various parts, such as a steering supporter member or a harness attachment fixture, attached to a pipe-shaped member.

As parts are primarily attached to these steering members via welding, specialized assembly jigs are used to hold the parts in place during welding so that the parts are attached to the steering member at positions according to design (see, for example, Japanese Laid-Open Patent Application No. H08-048174).

SUMMARY

However, if jigs are used to hold parts in place during welding, the jigs must be inconveniently repositioned or changed out for differently shaped jigs when the parts are rearranged or differently shaped parts are used.

Therefore, an object of the present invention is to provide a method and device for manufacturing a joined piece capable of flexibly adapting to changes in the positions of parts joined to a vehicle component such as a steering member, or changes in the parts themselves.

In order to achieve the abovementioned object, a manufacturing method is provided for manufacturing a joined piece involving operating a robot according to pre-inputted instruction data to join a first member to a second member to create the joined piece. The method comprises: operating the robot to hold the second member at a holding position for joining to the first member and photographing the second member using a camera to obtain a first positioning image of the second member at the holding position; comparing the first positioning image to a reference image taken by a camera of a joining position of a reference second member joined to a reference first member; determining a deviation amount by which the holding position of the second member deviates from the joining position in the reference image based on comparison results thereof; determining, based on the deviation amount, a correction amount by which the holding position of the second member is to be corrected in order to reduce the deviation amount of the holding position of the second member; and correcting the holding position of the second member according to the correction amount, and then subsequently joining the second member to the first member to form the joined piece.

In order to achieve the abovementioned object, a manufacturing device is provided for manufacturing a joined piece involving holding at a holding position a second member to be joined to a first member, followed by joining the second member to the first member to create the joined piece. The manufacturing device comprises a first robot, a second robot, a third robot, a camera and a controller. The first robot is configured to hold the first member. The second robot is configured to hold the second member at a predetermined position on the first member. The third robot is configured to hold the second member being held by the second robot to the first member at a holding position. The camera is arranged to obtain an image of the second member being held to the first member or the second member joined to the first member. The controller is programmed to compare a first positioning image taken by the camera of the second member to be joined to the first member being held at the holding position by the second robot being operated according to pre-inputted instruction data, and a reference image taken by the camera of a second reference member joined to a reference first member. The controller is programmed to correct the holding position at which the second member is being held by the second robot.

In accordance with the present invention, an image taken of a second member to be joined to a first member being held at a holding position prior to being joined is compared to a reference image, the deviation amount of the holding position of the second member is determined based on the results of the comparison, the correction amount for the holding position of the second member is determined according to the deviation amount, the position of the second member is corrected according to the correction amount, and the members are joined. It is therefore sufficient to perform manual measurement only once, after which a positional correction amount for the part can be obtained via an image of the second member and image processing alone, allowing for accurate part attachment. This allows for flexible adaptation to changes in part positions or in the parts themselves.

BRIEF DESCRIPTION OF THE DRAWINGS

Referring now to the attached drawings which form a part of this original disclosure.

DETAILED DESCRIPTION OF THE EMBODIMENTS

Figure 1:
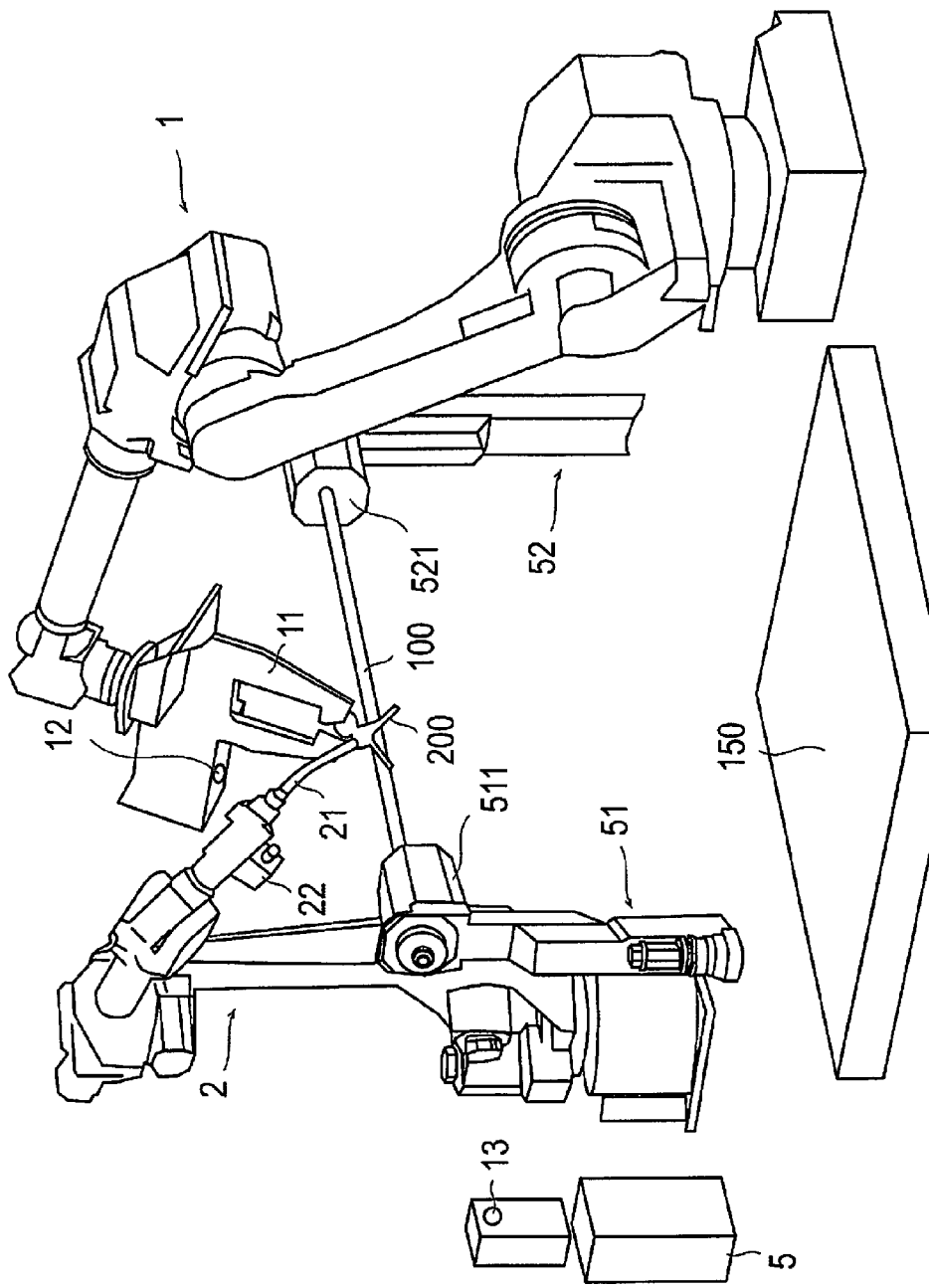
FIG. 1 is a top perspective view showing the features of a device for manufacturing a joined piece according to an embodiment of the present invention.

An embodiment of the present invention will be described hereafter with reference to the attached drawings. In the descriptions of the drawings, identical or similar parts are assigned the same reference number, and redundant description thereof will be omitted. The sizes and proportions of the various members in the drawings have been exaggerated for ease of illustration, and do not represent actual sizes or proportions.

FIG. 1 is a schematic top perspective view showing the features of a device for manufacturing a joined piece according to an embodiment of the present invention.

A device for manufacturing a joined piece, such as a steering member, comprises two robots (a hand robot 1 and a welding robot 2) and supports 51 and 52 for supporting a steering member basepiece 100 constituting a workpiece. The control is also provided with a controller 5 for controlling the operation of the various parts. In the present embodiment, the supports 51, 52 are equivalent to a first robot. The description of the present embodiment will feature a steering member as an example of a vehicle component, but the joined piece is not limited to a steering member. The description of the present embodiment will feature welding as an example of a joining method for joining the parts constituting the steering member.

The two robots are a robot comprising a hand (herein referred to as a hand robot 1 (equivalent to a second robot)) and a welding robot 2 (equivalent to a third robot). The two robots are multiaxial robots that perform predetermined operations according to shared instruction.

A hand 11 is attached to an arm end of the hand robot 1. The hand robot 1 grasps a part in a predetermined direction using the hand 11, and positions and holds the grasped part at a designated position with respect to the steering member basepiece 100. Parts are laid upon a parts table 150, and the hand robot 1 picks up a part off the parts table 150 and positions and holds the part at a predetermined position over the steering member basepiece 100. Parts are brought to the parts table 150 by another robot or a conveyor belt not shown in the drawing. The hand robot 1 may also grab approaching parts off a conveyor belt rather than a parts table 150.

A first camera 12 for photographing in the direction of the tip of the hand 11 is attached near the hand 11. The first camera 12 is used to photograph a part being selected by the hand 11 in order to ascertain its orientation and size.

A second camera 13 is installed within the operating range of this process. The second camera 13 is used to confirm the orientation of the object being grasped by the hand 11.

After picking up a part off the parts table 150, the hand robot 1 holds the part up to the second camera 13. The second camera 13 then photographs the part being grasped by the hand 11, and confirms, via imaging, the orientation and position at which the part is being grasped by the hand 11. The hand robot 1 then corrects the orientation of the part according to the orientation and position determined by the second camera 13 so that it can position and hold the part over the steering member basepiece 100. The hand robot 1 is thereby capable of positioning and holding the part at the designated position with respect to the steering member basepiece 100. The operation of correcting the orientation of the part grasped by the hand 11 is a typical operation performed by hand robots; thus, description thereof will be omitted.

A welding torch 21 is attached to an arm end of the welding robot 2. The end of the welding torch 21 is positioned, according to the position of the part positioned over the steering member basepiece 100, at a position at which it can weld the part. Thus, instructions for the position of the end of the welding torch 21 are given according to the part position instructions given to the hand robot 1. When the position of the part held by the hand robot 1 is corrected, the position of the end of the welding torch 21 is also corrected in tandem therewith. Welding may optionally be performed via laser welding. In such cases, a laser emitter is attached to the end of the robot arm instead of a welding torch 21.

A third camera 22 is also installed at the end of the arm of the welding robot 2—in this instance, near the base of the welding torch 21 where the welding torch 21 is attached. The third camera photographs the part being positioned and held by the hand 11. The photographed image is used to determine the position (and/or inclination) of the part. To this end, the third camera 22 is provided with a function for measuring distances the sizes of and distances between objects in the photographed image (said function being referred to herein as an in-image distance measuring function). In one example of an in-image distance measuring function, an object (fiducial marker) serving as a reference for distances within the image is first photographed, and the correspondence between the actual size of the fiducial marker and its size within the image is determined. Then, using the stored correspondence between the actual size of the fiducial marker and its size in the image, the sizes of and distances between objects photographed for measuring purposes are determined. A known in-image distance measuring function may be used without any particular limitations.

The third camera 22 may also be provided with a ranging function for measuring the distance from the current position of the third camera 22 to an object being photographed. Passive ranging used to focus the third camera or active ranging using a laser beam or ultrasonic waves may be used for the ranging function. A known ranging function may be used without any particular limitations. Using a ranging function and an in-image distance measuring function as described above allows the position of a part measured by the third camera 22 to be calculated as a position within an operating coordinate system of the welding robot 2.

Image processing during in-image distance measurement and, as necessary, ranging, as well as any calculation necessary therefor, is performed by the controller 5.

The supports 51 and 52 rotatably support the steering member basepiece 100 so that it rotates around its lengthwise direction while holding the two ends of the steering member basepiece 100 so that it is immobile in the lengthwise direction. To this end, the supports 51 and 52 hold the two ends of the steering member basepiece 100. The supports 51, 52 are provided with dampers 511, 521 for clamping the ends of the steering member basepiece 100. The clampers 511, 521 clamp the two ends of the steering member basepiece 100, preventing the steering member basepiece 100 from moving in the lengthwise direction. One support 51 is provided with a servo motor (not shown) equipped with an encoder for rotating the clamper. The motor is equipped with a brake that prevents it from rotating unexpectedly when the motor is not being operated. Feedback from the encoder is used to obtain the angle of rotation (amount of rotation). The damper for the other support 52 rotates freely.

A basepiece reference point indicating the origin during rotation is set for the steering member basepiece 100 or for a pre-attached side bracket, to be described hereafter. When the steering member basepiece 100 is set on the supports 51 and 52, the basepiece reference point is aligned with a predetermined position. The basepiece reference point may be in the form, for example, of a screw hole provided in the steering member basepiece 100 or the side bracket, a pre-attached screw, a cutout, or the like. Naturally, other cutouts or marks may also be provided as clear reference points.

The position of the lengthwise direction when the steering member basepiece 100 is set on the supports 51 and 52 is restricted with respect to the lengthwise direction by the dampers clamping the side brackets of the steering member basepiece 100, so that it is always in an appropriate position. The position of the lengthwise direction is controlled by moving the steering member basepiece 100 on the supports 51 and 52 according to the difference in the length of the steering member basepiece 100.

A configuration in which the clampers themselves are not provided with a source of motive power, such as a motor, and simply freely rotate and restrict movement in the lengthwise direction, and the steering member basepiece 100 is rotated by a separate roller or the like is also acceptable. Any other sort of mechanism for rotating the steering member basepiece 100 is also acceptable, and the present invention is not limited to dampers, rollers, or the like. The supports 51, 52 supporting the steering member basepiece 100 autonomously control the rotation of the steering member basepiece 100; apart from these, a robot comprising an articulated arm, like the hand robot 1 or the welding robot 2, is also acceptable.

The steering member basepiece 100 is a pipe-shaped member normally constituted by a steel pipe. Side brackets constituting fixtures for attaching the steering member to a vehicle are attached to both ends of the steel pipe in a step preceding the present process. Thus, the clampers clamp these side brackets.

In the context of the present specification, "steering member basepiece" refers to the steering member in a state prior to having parts attached thereto in this process, and encompasses cases in which other parts are already attached thereto.

The controller 5 controls the operation of the hand robot 1 and the welding robot 2 and the rotational position of the steering member basepiece 100 via the supports 51 and 52. The controller 5 is also provided with an image processing function for correcting the position of parts grasped by the hand 11 based on images taken by the second camera 13, calculating the distances between objects (in this case, parts) based on images of the objects taken by the third camera 22, and so forth.

The control of the hand robot 1 by the controller 5 is accomplished by executing pre-inputted data (instruction data) indicating to perform a predetermined operation. The welding robot 2 is controlled in a similar manner by executing pre-inputted instruction data indicating to perform a predetermined operation. The operation of the robots may also be controlled by a robot controller provided for each of the robots. In such cases, one of the robot controllers may optionally send a coordinated operation signal to the other robot controller when the hand robot 1 and the welding robot 2 operate simultaneously (such as when welding is being performed). In such cases, after, for example, the robot controller for the hand robot 1 has operated to position the part over the steering member basepiece 100, it then outputs a signal to the welding robot 2 to begin the welding operation. Having received the signal to begin welding operation, the robot controller for the robot initiates welding on the part of the welding robot 2.

One image processing function performed by the controller 5 is to determine the orientation and position of the part grasped by the hand 11 based on the image taken by the second camera 13. Another function is to measure the distances between objects in the image taken by the third camera 22. The controller (not shown) for the hand robot 1 determines the orientation and size of the part photographed by the first camera 12 when the part is picked up, and the hand robot 1 picks up parts on the basis thereof. The operation of picking up objects is well known for robots in recent years; thus, description thereof will be omitted.

In the drawing, the controller 5 is disposed within the operating range of this process, but it may be located anywhere as long as it is capable of controlling the robots and the supports 51 and 52. Signal cables connect the controller 5 to the robots and the cameras to the support 51; these have been omitted in the drawing.

A process of manufacturing a steering member using a steering member manufacturing device configured as described above will now be described.

Figure 2:
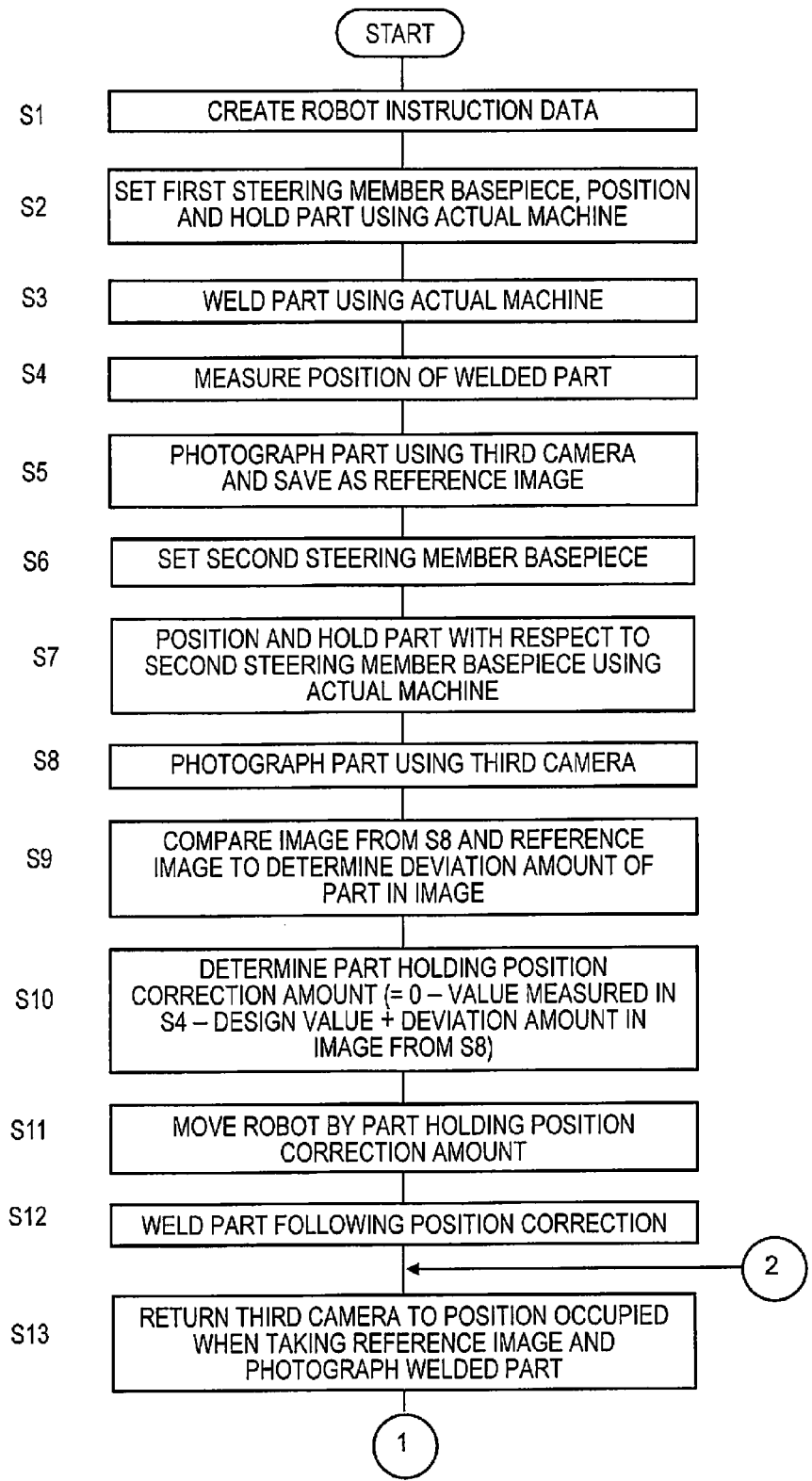
FIG. 2 is a flow chart illustrating a process for a method of manufacturing a steering member as an example of a joined piece.
Figure 3:
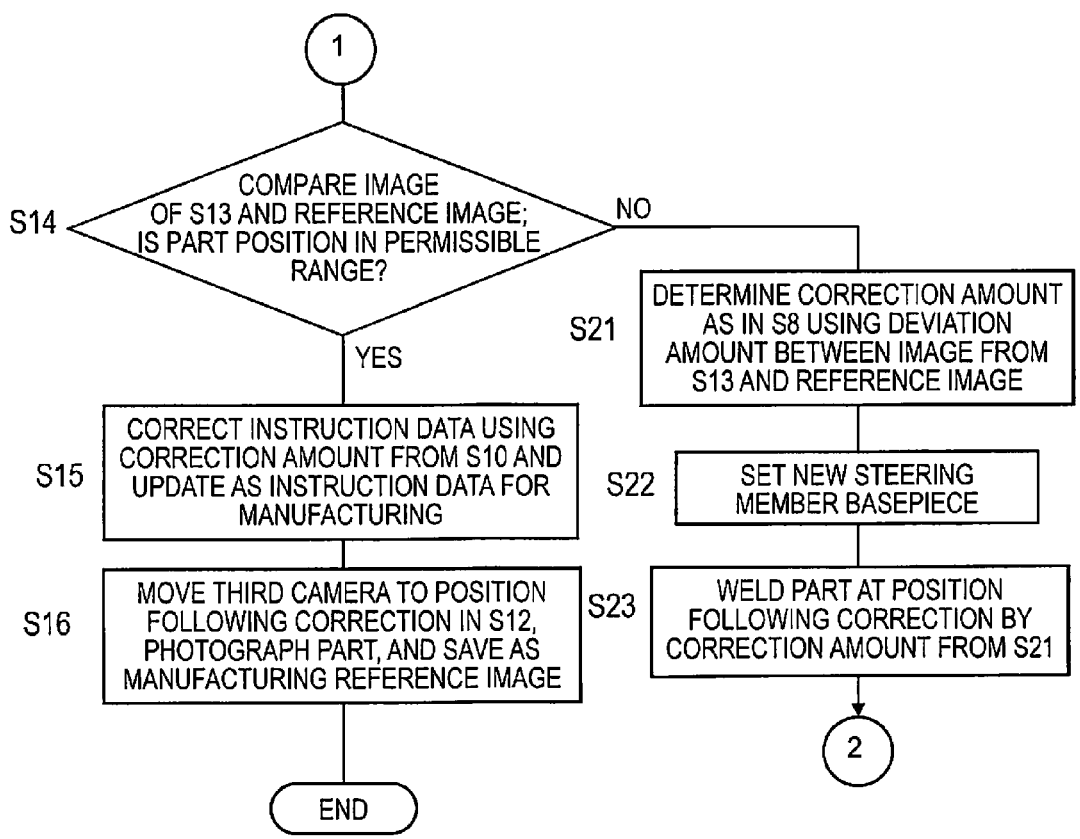
FIG. 3 is a flow chart, continuing from that of FIG. 2, illustrating a process for a method of manufacturing the same steering member.

FIGS. 2 and 3 are flow charts illustrating a process for a method of manufacturing a steering member.

First, robot instruction data is created using a simulator (S1). The instruction data created at this time is for the operation of the hand robot 1 and the welding robot 2 and the rotation of the steering member basepiece 100.

The contents of the instructions are as follows.

(1) The instructions for the hand robot 1 are to recognize and pick up a part off the parts table 150, photograph the part using the second camera 13, recognize and correct the position and orientation of the part, and position and hold the part at a predetermined position over the steering member basepiece 100. After a welding complete signal is received from the welding robot 2, the process proceeds to the next part. This operation is repeated until the last part has been attached. After the last part has been attached, the robot returns to its original position. The position at which the part is positioned and held is found using a predetermined part reference point on the part. The part reference point is, for example, the edge of the part, or a pre-provided reference hole.

(2) The instructions for the welding robot 2 are to photograph the part using the third camera 22 after a signal indicating that the hand robot 1 has finished positioning the part has been received. The welding torch 21 is then moved to the position of the part, and welding is performed.

(3) The instructions for the rotation of the steering member basepiece 100 are to rotate the steering member basepiece 100 for each of the parts grasped by the hand robot 1 to an orientation allowing the parts to be easily attached.

The contents of the various instructions are carried out in concert by the robots and supports via controls signals controlling the entirety of the device sent out by the controller 5. Once the steering member basepiece 100 has been set on the supports 51 and 52, positioning and welding operations are carried out for a plurality of attachable parts.

Once the simulated robot operation instructions have been completed, the instruction data is loaded into an actual robot, and part attached and instruction data correction is carried out by the actual robot.

During actual machine operation, the machine is first operated using the instruction data to produce a first prototype. To do this, parts are positioned and held over an actual steering member basepiece 100 (the steering member basepiece 100 at this stage will be referred to as the first steering member basepiece) (S2). Next, the positioned part is welded (S3). If a plurality of parts is to be attached to the first steering member basepiece, all of the parts are welded.

After welding, the positions of the welded parts are measured (S4). This measurement is performed manually. The measurement results are recorded. This completes the first prototype. If there is a plurality of parts, all of the parts are measured, and the values measured for each part are recorded. Because this recording is performed manually, the values may be stored in a computer external to the controller 5 or added to process management records (such as a paper logbook or the like).

Next, the welded parts are photographed by the third camera 22, and the photographed images are stored in the controller 5 (S5). The stored images are referred to as reference images. The positions of parts within images of later prototypes are compared to the positions of the parts within these reference images (these positions being equivalent to reference first member and second member joining positions) in order to find part position deviations using the images.

The position of a part within a reference image is taken as its 0 (zero) point. The direction of deviation towards a reference end of the steering member basepiece 100 (in FIG. 5, described hereafter, the end towards the side bracket 101) is referred to as the − (minus) direction, and the direction of deviation in the opposite direction (towards side bracket 102 in FIG. 5) as the + (plus) direction. If there is a plurality of parts, a reference image is created for all of the parts.

Figure 5:
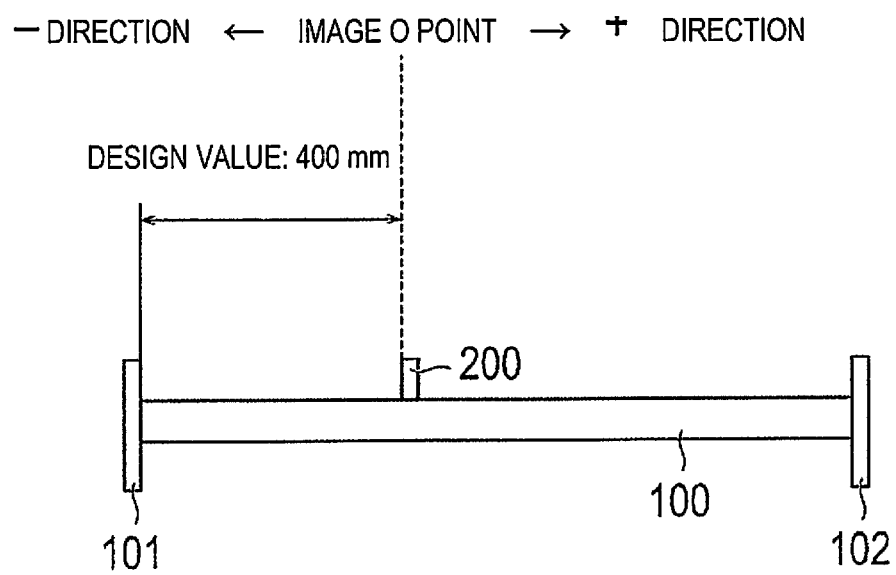
FIG. 5 is a schematic view illustrating an example of a prototype.

An example of a prototype will now be described in order to illustrate the flow of operations. FIG. 5 is a schematic view illustrating an example of a prototype.

As shown in the drawing, side brackets 101 and 102 are attached to the two ends of the steering member basepiece 100. In the prototype, a part 200 is welded to the steering member basepiece 100 according to steps S1-5. The design value for the position at which the part 200 is attached is 400 mm from the side bracket 101 on the reference end. The part 200 is welded at the attachment position, and a reference image is taken. The position of the part within the image at this time is taken as its 0 (zero) point. The distance from the side bracket 101 on the reference end to the part reference point is then measured. Let us assume that the actually measured results were 401.5 mm. This would indicate welding at a position deviated +1.5 mm with respect to the design value. However, within the reference image, the position of the part welded at this deviated position is the 0 point.

In the foregoing description, only the deviation amount with respect to the lengthwise direction of the steering member has been discussed as an example of deviation in the position of a part. However, deviation in part positions not only with respect to the lengthwise direction, but also with respect to the circumferential direction (i.e., the position orthogonal to the lengthwise direction) of the steering member and the attachment angle (inclination) of the part 200 is measured manually and via image processing. Deviation in terms of the circumferential direction and part angles may be measured similar to that in terms of the lengthwise direction; thus, description thereof will be omitted. The same holds for subsequent steps.

We now return to the description of the process of manufacturing the steering member.

Once measurement of the first prototype is complete, the first prototype is removed from the supports 51 and 52, and a second steering member basepiece (equivalent to a first member) for a second prototype is set on the supports 51 and 52 (S6). At this time, the basepiece reference point for the second steering member basepiece is aligned. The side brackets are clamped in the lengthwise direction by the clampers, yielding the same position as in the case of the first prototype.

Next, in order to attach a part 200 (equivalent to second member), identical to that used in the first prototype, using the hand robot 1, the hand robot 1 is operated using the instruction data to position the part with respect to the second steering member basepiece and hold the part in position (S7).

Next, this state is photographed by the third camera 22 (S8). In other words, the held part is photographed in a state prior to its position being corrected. The photographed image and the reference image are then compared to determine the deviation amount of the position of the part 200 (S9). This process is performed by the controller 5. At this time, the third camera 22 is at the same position as when the first prototype was photographed. The first prototype was in the post-welding stage when photographed, but photographing is performed prior to welding here.

The deviation amount of the position of the part 200 is calculated in S9 by comparing the position of the part in the image taken in S8 with the position of the part in the reference image, thereby determining the deviation amount of the position of the part in the image. This deviation may be converted to actual size (in mm) by referring to the correspondence between the actual size of the object obtained using the fiducial marker and the distance (here, deviation amount) in the image, as discussed above.

Let us assume that the position of the part was deviated 1.9 mm in the direction of the reference end in the reference image in S9. This would be equivalent to a deviation of −1.9 mm from the 0 point in the reference image.

Next, the image taken in S8, the reference image, and the in-image deviation amount determined in S9 are used to determine the correction amount for the holding position in order to return the part attachment position to the correction position (design value) (S10).

The correction amount for the part holding position is determined using the formula 0 − value measured in S4− design value+deviation amount in image from S8 (0 representing the 0 point indicating the position of the part within the reference image).

In the example described above, there was a deviation of +1.5 mm in the post-welding measured value for the first prototype, and a deviation of −1.9 mm in the pre-welding image taken in S8. Accordingly, the correction amount for the holding position is 0-400 (design value)−401.5 (measured value)+(−1.9)=+0.4.

This +0.4 indicates the amount of correction necessary, and is obtained by adding the deviation of the part 200 when being held and the deviation arising during welding.

The amount of movement necessary for the hand robot 1 to move the position of the part by the correction amount for the part holding position obtained in S10 is inputted into the controller 5, and the position of the part is corrected (S11). In the foregoing example, the part holding position correction amount is +0.4 mm. Accordingly, the instruction data is corrected to instruct the hand robot 1 to shift the position of the grasped part 200 +0.4 mm (0.4 mm in the direction opposite the reference end). At this stage, rather than re-grasping the part 200, it is sufficient simply to move the end of the hand 11 of the hand robot 1 0.4 mm in the direction opposite the reference end.

After the position of the part has been corrected (i.e., the part 200 has been moved) by the hand robot 1, the part 200 is welded by the welding robot 2 (S12). The position of the welding robot 2 is also corrected as in S11 above. A second prototype (equivalent to a joined piece) is thereby completed.

Subsequently, the third camera 22 is returned to the position it occupied when taking the reference image, and the welded part 200 is photographed by the first camera 12 (S13). The position of the third camera 22 was changed when the welding robot 2 is moved to perform welding in S12; thus, the third camera 22 is now returned to the position it occupied when taking the reference image. In other words, the robot is moved back to its pre-correction position by the amount by which its position was corrected in S11 in order to take the image. At this stage, the part 200 has been welded, so the hand 11 may be opened and the part released.

The reason why the position of the third camera 22 is returned by an amount equal to the correction amount in S13 is that, if the position of the first camera 12 changes when performing confirmation in S14, to be described hereafter, the part 200 within the photographed image and the part with the reference image cannot be compared without modification. It is also acceptable to leave the position of the third camera 22 unchanged, and modify the position of the part within the image by the correction amount for the position of the robot via image processing.

Subsequently, the image taken in S13 and the reference image are compared to confirm whether the welded part is welded at a position within a permissible range with respect to a predetermined position (design value) (S14).

In the foregoing example, if the position of the part within the image taken in S13 is deviated in S14 by −1.5 mm with respect to the reference image, the part 200 is welded as per design. That is, because the position of the part within the reference image when the actual measured value is 401.5 mm is taken as the 0 point in the first prototype, the position of the part is deviated +1.5 mm from the correct position (design value: 400.0 mm). If an image is taken in S13 from the same position as the reference image and the position of the part is deviated −1.5 mm from the position of the part in the reference image, the actual part 200 is welded at a position deviated −1.5 mm from 401.5 mm. In other words, the part 200 is at the design value of 400.0 mm.

In S14, if the position of the part 200 in the finished second prototype post-welding is within the permissible range with respect to the design value, product quality is rated PASS (S14: YES). The instruction data corrected using the part holding position correction amount obtained in S11 is then stored in the controller 5 as final instruction data for the hand robot 1 and the welding robot 2 (S15: instruction data updated). The first camera 12 is again returned to the position of the position-corrected robot and used to take an image of the welded part 200 that is stored in the controller 5 as a manufacturing reference image for use during manufacturing (S16). If there is a plurality of parts, the process from S7 to S16 is repeated for each of the parts. The process is then ended.

The instruction data updated in S15 is used during mass production. In S15, the instruction data itself may be altered and updated so as to include the correction amount from S10. Alternatively, it is acceptable to store a correction amount correcting the attachment positions for each of the parts indicated in the initial instruction data correction amount along with the instruction data, and append data in which the part position indicated in the instruction data is corrected by this correction amount every time a part is attached.

Meanwhile, if the product quality is rated FAIL in S14 (S14: NO), a correction amount for the robot is determined using the deviation amount in the image from S13 in a manner similar to S8 (S21). A new steering member basepiece is then set on the supports 51 and 52 (S22). The position of the hand robot 1 is corrected by the correction amount determined in S21, and welding is performed (S23). The process then returns to S13, and the subsequent process is repeated until a PASS rating is finally obtained in S14.

Subsequently, during mass production, the instruction data and manufacturing reference image obtained through the foregoing process can be used to manufacture steering members.

Figure 4:
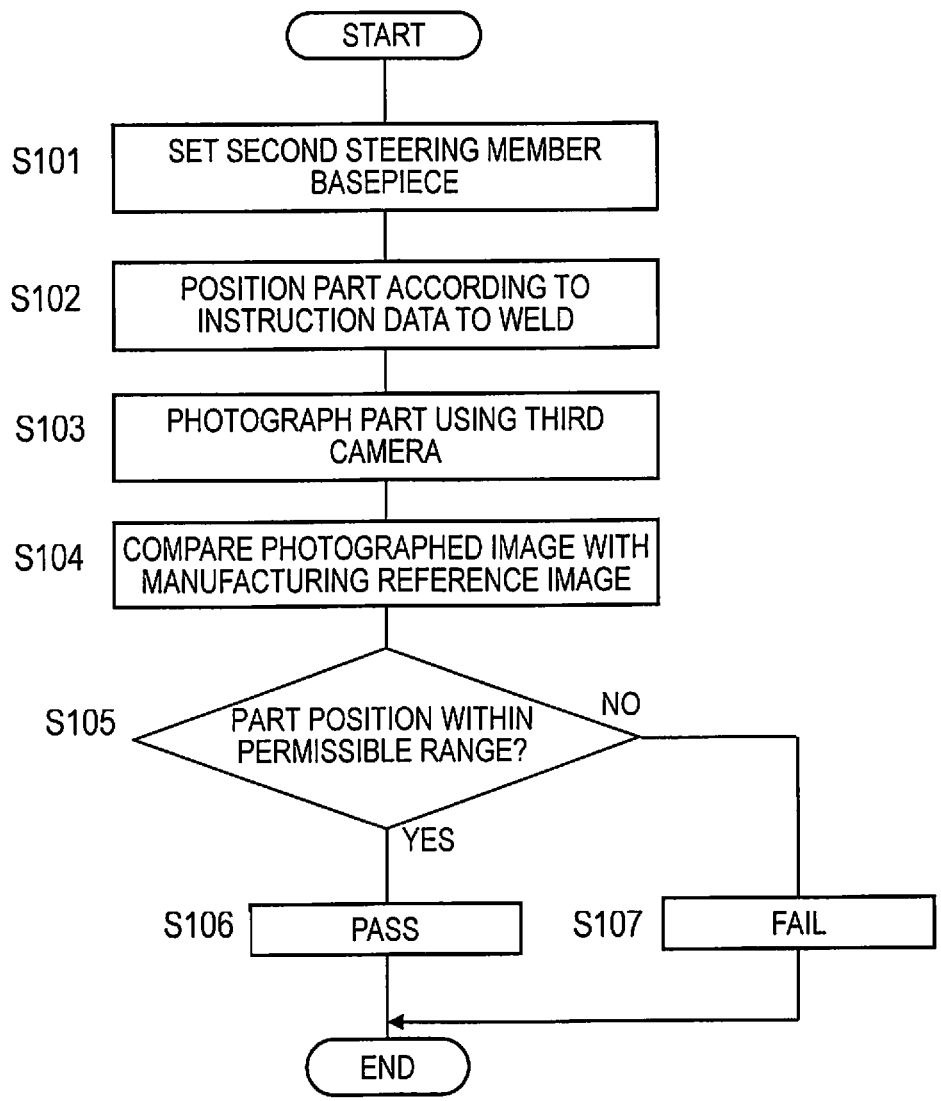
FIG. 4 is a flow chart illustrating a process for a method of manufacturing the same steering member in mass production.

FIG. 4 is a flow chart illustrating an example of a process for using the obtained instruction data and manufacturing reference image to mass produce steering members.

First, a steering member basepiece is set on the supports (S101), and a part is positioned by the hand robot 1 according to the instruction data, the n welded (S102). Instruction data in which the holding position for the part has been corrected, as discussed previously, is used for the positioning of the part by the hand robot 1. The part is then photographed by the third camera 22 (S103), the position of the part is compared to the manufacturing reference image stored in S16 (S104), and, if the deviation amount is within the permissible range (S105: YES), the attachment quality of the part may be rated PASS (S106). If the deviation amount is not within the permissible range in S105, a FAIL rating is returned (S107).

The PASS/FAIL decision is made by the controller 5 (control means). The permissible range referred to herein is a product management standard indicating the acceptable level of deviation in the various parts 200 in the finished steering member. As such, a suitable permissible range is set for each steering member being manufactured.

Mass production can also be performed without performing confirmation using the third camera 22 in this way. This is because the operation of positioning the part performed by the hand robot 1 is corrected so that the position of the welded part is the position in the design, as discussed above, allowing accurate part attachment to be performed using instruction data that has been so corrected. If confirmation is not performed using the third camera during mass production, the third camera may be removed without performing its photographing operation (the operation of the welding robot accompanying photographing). In particular, some production lines separate the processes of manufacturing products and inspecting manufactured products. Thus, it is unnecessary to perform confirmation using the third camera if manufacturing and inspection are separated.

The present embodiment described above yields the following effects.

(1) The position of a part when the part has been welded to the first steering member basepiece is measured and an image thereof taken by a camera (the third camera) is used as a reference image, after which a part is positioned over a second steering member basepiece and photographed prior to being welded, and these images are compared to determine a correction amount for correcting the deviation in the position of the part. It is therefore sufficient to perform manual measurement only once, after which a positional correction amount for welding the part at the correct position can be obtained via an image of the part and image processing alone, allowing for accurate part attachment.

This eliminates the need for part-immobilizing jigs for each of the parts, as in the prior art. It is thus possible to adapt to changes in part position or in parts themselves more easily and flexibly than in cases in which the corresponding jig must be changed whenever there is a change in the position of a part or in the part itself, as in the prior art.

(2) An image of a part that has been welded after its position has been corrected according to the correction amount is compared with a reference image to confirm whether the joining position of the steering member basepiece 100 and the part 200 is within a set permissible range. If the position of the part 200 is confirmed as being within the permissible range, the instruction data is corrected so that the part 200 takes on the set position using the correction amount obtained in S10 in FIG. 2.

As a result, the instruction data can be corrected based on the results of comparing the image data for the welded part 200 and the reference image, eliminating the need for a worker to perform manual correction. As a result, ease of work, and thus production efficiency, can be improved.

(3) The post-welding reference image taken of the first prototype and the pre-welding image of the second prototype are taken at the same camera position. Deviations in the positions of individual parts can thus be easily detected simply by comparing the two images.

(4) An image of the second prototype taken when the joining position of a part after welding has been confirmed to be within a permissible range is stored in the controller 5 as a manufacturing reference image, and this manufacturing reference image and images taken of actually manufactured welded parts are compared in subsequent manufacturing. It is thus possible to easily determine whether the position of a welded part is correct simply by comparing images during manufacturing.

(5) If the position of the part 200 is corrected by the hand robot 1, the instruction data is concomitantly corrected so that the position of the end of the welding torch 21 that welds the steering member basepiece 100 and the part 200 is also corrected. This prevents deviation in the welding positions of steering member components from occurring even if the positions of the steering member components are altered. This allows welding of components to be performed at the set positions, yielding satisfactory accuracy of the welding positions of the various components upon the steering member.

(6) The steering member basepiece is supported by the support prior to a part being attached thereto, the hand robot holds a part at a predetermined position on the steering member basepiece, and the welding robot welds the part to the steering member basepiece. The control means then compares a reference image, taken by a camera, of the joining position of a part that has been welded according to design, and a camera image at the position at which the part is held, and corrects the position of the part prior to welding. It is therefore possible to determine a correction amount for moving the part to a position within the permissible range simply by first preparing a reference image, then subsequently photographing a welded part using a camera. This allows steering member components to be accurately positioned by the hand robot prior to welding, eliminating the need for a jig to immobilize individual parts at attachment positions, as in the prior art. This allows for flexible adaptation to changes in part positions or in the parts themselves.

(7) Even if the device or method for manufacturing a joined piece according to the present embodiment is used to manufacture a steering member, the part yielded by welding the steering member basepiece 100 and the part 200 need only be measured once, allowing for subsequent measurement to be handled by taking images and performing image processing. This allows for flexible adaptation to changes in the positions of parts welded to the steering member basepiece 100 or in the parts themselves.

(8) In the present embodiment, the steering member basepiece 100 and the part 200 are joined via welding, enabling the two to be joined swiftly and easily, and allowing the productivity demanded during mass production to be met.

The foregoing has been a description of one embodiment of the present invention, but the present invention is not limited to this embodiment.

In the embodiment described above, the third camera 22 is moved to the same position at which the reference image of the first prototype was taken before photographing the second prototype. This is because the images are compared without further modification to determine the deviation in the position of the part 200. Accordingly, the position of the third camera 22 need not be identical at every step in which photographing is performed using the third camera 22 as long as the deviation of the position of the part can be determined. For example, another member shown along with the part 200 in the image taken of the part 200 by the third camera 22 can be used as a reference (an "in-image reference point") to determine the distance between the in-image reference point and a reference point for the part 200. Any sort of in-image reference point may be used as long as it does not move within the image and allows for easy determination of the distance to the reference point for the part 200. Examples include a reference point provided on the steering member basepiece 100, an already attached side bracket, a screw hole in the steering member basepiece 100, or another already attached part 200 or mark.

By using an object or marker upon the steering member basepiece 100 as a reference point in this way, there will be no change in the distance from the part 200 to the in-image reference point even if the position of the third camera 22 varies when parts are being attached, leading to the part 200 being shown at different positions in the images. Thus, by determining the distance of the part 200 from the in-image reference point and using this distance to determine distances within a reference image or robot position correction amounts, the need to keep the third camera 22 at the same position in every step is eliminated. In order to more accurately determine the position of the attached part 200, it is acceptable to set a plurality of in-image reference points (none of which move within the image) and compare the distances therebetween in the image with the distance to the reference point for the part 200 being attached. Setting a reference point within the image in this way also makes it possible to take the reference image of the first prototype and the image of the second prototype using different cameras.

In the foregoing embodiment, the third camera 22 was attached to the welding robot 2, but it is also acceptable to instead provide a camera fixed at a position where it is capable of photographing the attached parts 200. Fixing the camera in place eliminates the need to move the camera to the same position when taking the post-welding reference image of the first prototype and the image of the part 200 being held when manufacturing the second prototype.

In the foregoing embodiment, a simulator was used to create the instruction data for initially operating the robots and supports, but an actual machine may be used instead.

(Alternative Embodiment)

The foregoing embodiment features a process of creating robot instruction data (S1), setting a first steering member basepiece and positioning a part (S2), welding the positioned part (S3), measuring the position of the part (S4), storing a reference image (S5), setting a steering member basepiece (S6), positioning and holding a part (S7), photographing the part (S8), calculating the deviation amount of the part (S9), calculating a correction amount for the part (S10), correcting the position of the part (S11), welding (S12), photographing the welded part (S13), comparing the photograph image with the reference image (S14), updating the instruction data (S15), and storing a manufacturing reference image (S16).

However, the present invention is not limited to the foregoing embodiment, and the instruction data need not be updated. In other words, it is acceptable to perform the process from the creation of the robot instruction data (S1) to the welding of the part to the second steering member basepiece (S12), followed by repeating the process from setting a new steering member basepiece (S6) to positioning and holding a part (S7), photographing the part (S8), calculating the deviation amount of the part (S9), calculating a correction amount for the part (S10), correcting the position of the part (S11), and welding (S12). The process from creating robot instruction data (S1) to storing a reference image (S5) may be performed in advance.

The foregoing embodiment and alternative embodiment were embodiments involving the manufacture of a steering member, but the present invention is not limited to being applied to steering members. The joining method is not limited to welding; fastening via bolts or like or bonding via an adhesive or the like is also acceptable. In the foregoing embodiment, the part 200 is welded to the steering member basepiece 100 when manufacturing the first prototype, but the welding method used may be a temporary, non-permanent method.

Various modifications may be made to the present invention based on the features set forth in the claims; such modifications naturally also fall within the scope of the present invention.

The invention claimed is:

1. A manufacturing method for manufacturing a joined piece involving operating a robot according to pre-inputted instruction data to join a first member to a second member to create the joined piece, the method comprising:
    operating the robot so as to hold the second member at a holding position and photographing the second member using a camera to obtain a first positioning image of the second member at the holding position;
    comparing the first positioning image to a reference image taken by a camera of a joining position of a reference second member joined to a reference first member;
    determining a deviation amount by which the holding position of the second member deviates from the joining position in the reference image based on comparison results thereof;
    determining, based on the deviation amount, a correction amount by which the holding position of the second member is to be corrected in order to reduce the deviation amount of the holding position of the second member; and
    correcting the holding position of the second member according to the correction amount, and then subsequently joining the second member to the first member to form the joined piece;
    photographing the second member after the joining of the second member to the first member to obtain a joined image of the second member, comparing the joined image obtained thereby to the reference image, and confirming weather the second member joined to the first member is within a predetermined permissible range;
    correcting the instruction data for the robot to the position of the second member yielded by the correction amount for the holding position of the second member that was determined when the joining position of the first member and the second member is confirmed to be within the permissible range and
    in response to correcting the instruction data to within the permissible range, welding the first member and the second member together.

2. The manufacturing method according to claim 1, wherein
    the photographing of the second member to obtain the first positioning image is performed from the same position as for the photographing of the joining position of the reference first member and the reference second member.

3. The manufacturing method according to claim 2, further comprising
    photographing and saving the second member joined to the first member as a manufacturing reference image, after the correcting of the instruction data when the second member joined to the first member has been confirmed as being within the permissible range; and
    photographing an additional first member and an additional second member are that are to be joined to obtain an additional imaged, and comparing the additional second member joined to the additional first member in the additional image obtained thereby with the second member joined to the first member in the manufacturing reference image to determine whether a position of the additional second member is acceptable or not.

4. The manufacturing method according to claim 2, wherein
    upon correcting the holding position of the second member, the instruction data that designates the joining position for the robot to join the first member and the second member is corrected along with the holding position of the second member.

5. The manufacturing method according to claim 1, further comprising:
    photographing and saying the second member joined to the first member as a manufacturing reference image, after the correcting of the instruction data when the second member joined to the first member has been confirmed as being within the permissible range; and
    photographing an additional first member and an additional second member are that are to be joined to obtain an additional imaged, and comparing additional second member joined to the additional first member in the additional image obtained thereby with the second member joined to the first member in the manufacturing reference image to determine whether a position of the additional second member is acceptable or not.

6. The manufacturing method according to claim 5, further comprising
    photographing and saving the second member joined to the first member as a manufacturing reference image, after the correcting of the instruction data when the second member joined to the first member has been confirmed as being within the permissible range; and
    photographing an additional first member and an additional second member are that are to be joined to obtain an additional imaged, and comparing the additional second member joined to the additional first member in the additional image obtained thereby with the second member joined to the first member in the manufacturing reference image to determine whether a position of the additional second member is acceptable or not.

7. The manufacturing method according to claim 5, wherein upon correcting the holding position of the second member, the instruction data that designates the joining position for the robot to join the first member and the second member is corrected along with the holding position of the second member.

8. The manufacturing method according to claim 1, wherein
upon correcting the holding position of the second member, the instruction data that designates the joining position for the robot to join the first member and the second member is corrected along with the holding position of the second member.

9. The manufacturing method according to claim 1, wherein
the first member is an elongated steering member basepiece, and the second member is a part being joined to the steering member basepiece.

10. The manufacturing method according to claim 1, wherein the photographing of the second member to obtain the first positioning image is performed from the same position as for the photographing of the joining position of the reference first member and the reference second member.

11. The manufacturing method according to claim 1, wherein upon correcting the holding position of the second member, the instruction data that designates the joining position for the robot to join the first member and the second member is corrected along with the holding position of the second member.

12. The manufacturing method according to claim 1, wherein the first member is an elongated steering member basepiece, and the second member is a part being joined to the steering member basepiece.

13. A manufacturing device comprising:
a first robot configured to hold a first member;
a second robot configured to hold a second member at a predetermined position on the first member;
a third robot configured to hold the second member being held by the second robot to the first member at a holding position;
a camera arranged to obtain an image of the second member being held to the first member or the second member joined to the first member; and
a controller programmed to compare a first positioning image taken by the camera to a reference image taken by the camera and to correct the holding position at which the second member is being held by the second robot based on comparison of the first positioning image to the reference image, the first positioning image being an image of the second member being held at the holding position by the second robot being operated according to pre-inputted instruction data, and the reference image being an image of a second reference member joined to a first reference member,
the camera photographing the second member after the joining of the second member to the first member to obtain a joined image of the second member,
the controller comparing the joined image obtained thereby to the reference image, and confirming whether the second member joined to the first member is within a predetermined permissible range,
the controller correcting the instruction data for the robot to the position of the second member yielded by the correction amount for the holding position of the second member that was determined when the joining position of the first member and the second member is confirmed to be within the permissible range and
a welding device, in response to correcting the instruction data to within the permissible range, welding the first member and the second member together.

14. The manufacturing device according to claim 13, wherein
the first robot is configured to hold an elongated steering member as the first member, and
the second robot is configured to hold the second member as a part that is being joined to the steering member.

* * * * *